United States Patent
Efimov

(10) Patent No.: US 7,437,033 B1
(45) Date of Patent: Oct. 14, 2008

(54) APPARATUS AND METHOD FOR PUMPING OPTICAL FIBER

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 362 days.

(21) Appl. No.: 10/852,783

(22) Filed: May 24, 2004

(51) Int. Cl.
*G02B 6/34* (2006.01)
*H01S 3/00* (2006.01)

(52) U.S. Cl. ...................... 385/36; 359/341.3
(58) Field of Classification Search .............. None
See application file for complete search history.

(56) References Cited

U.S. PATENT DOCUMENTS

| | | | | |
|---|---|---|---|---|
| 5,267,063 A * | 11/1993 | Ray | ............ | 349/67 |
| 5,854,865 A | 12/1998 | Goldberg | ............ | 385/31 |
| 5,923,694 A | 7/1999 | Culver | ............ | 372/69 |
| 6,243,515 B1 | 6/2001 | Heflinger et al. | ............ | 385/37 |
| 6,263,003 B1 * | 7/2001 | Huang et al. | ............ | 372/6 |
| 6,317,537 B1 | 11/2001 | Ionov et al. | ............ | 385/32 |
| 6,477,295 B1 * | 11/2002 | Lang et al. | ............ | 385/31 |
| 6,490,388 B1 * | 12/2002 | Manzur | ............ | 385/27 |
| 6,603,905 B1 | 8/2003 | Ionov | ............ | 385/39 |
| 6,625,354 B2 * | 9/2003 | Hollister et al. | ............ | 385/36 |

FOREIGN PATENT DOCUMENTS

| EP | 1 065 764 A2 | 1/2001 |
|---|---|---|
| WO | 00/54377 | 9/2000 |

OTHER PUBLICATIONS

Jackel, J.L, et al., "Ion-Exchanged Optical Waveguides For All-Optical Switching," *Applied Optics*, vol. 29, No. 21, pp. 3126-3129 (Jul. 20, 1990).
Othonos, A., et al., *Fiber Bragg Gratings*, Artech House, Boston, pp. 78-79 (1999).
Sudo, S., Optical Fiber Amplifiers: Materials, Devices, and Applications, *Artech House*, Boston, pp. 406-407, 432 (1997).
Weber, Th., et al., "Side-Pumped Fiber Laser," *Applied Physics B.*, vol. 63, pp. 131-134 (1996).

* cited by examiner

*Primary Examiner*—Hemang Sanghavi
*Assistant Examiner*—Omar Rojas
(74) *Attorney, Agent, or Firm*—Ladas & Parry

(57) ABSTRACT

An apparatus and method for pumping optical fibers. An optical element is disposed for directing pump energy into the inner cladding of a dual clad optical fiber, where the optical element has a refractive index greater than the refractive index of the inner cladding. A gradient refractive index structure is disposed between the optical element and the inner cladding to provide for a smooth transition from the refractive index of the optical element to the refractive index of the inner cladding.

26 Claims, 4 Drawing Sheets

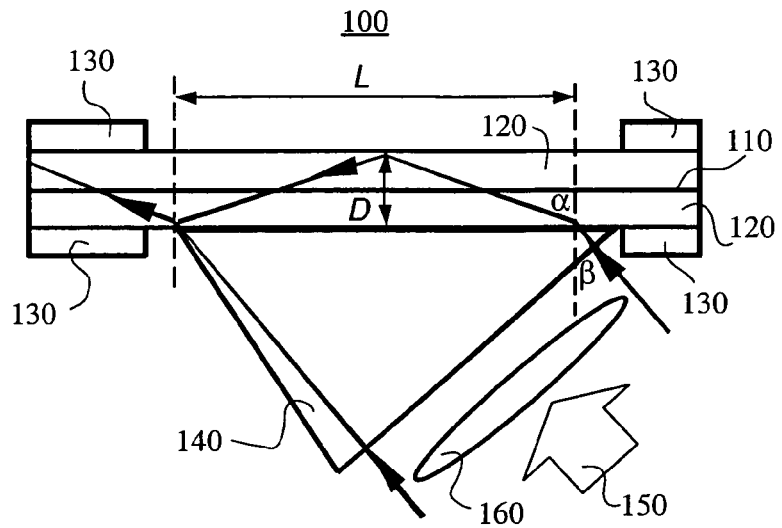
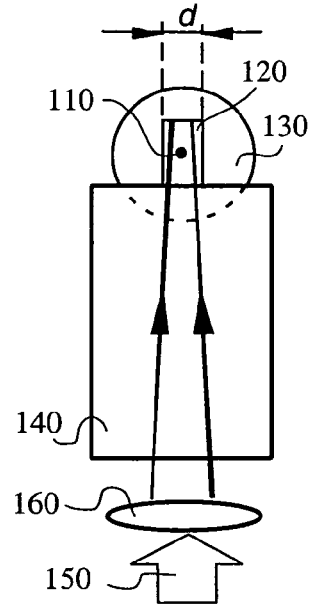
FIG. 1A
FIG. 1B
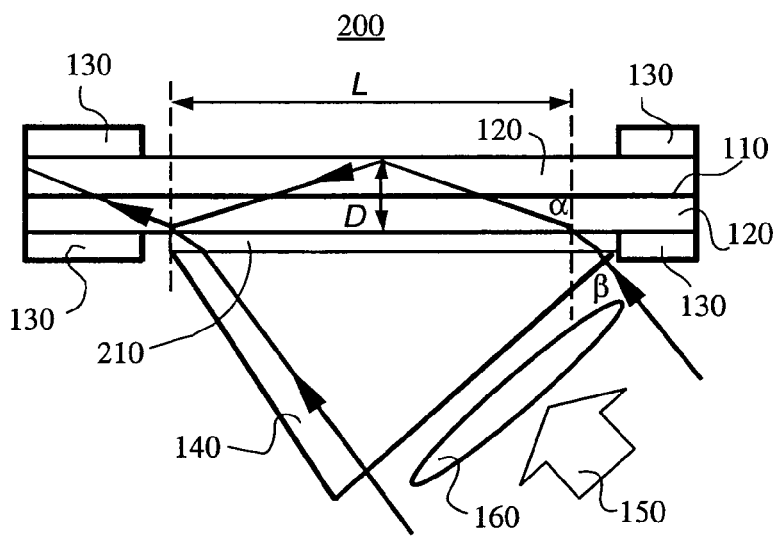
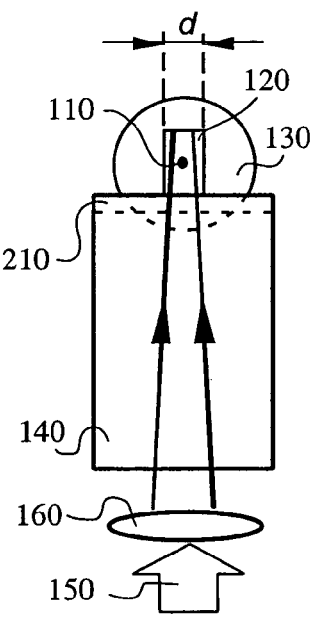
FIG. 2A
FIG. 2B

APPARATUS AND METHOD FOR PUMPING OPTICAL FIBER

BACKGROUND

1. Field

The present disclosure relates to an apparatus and method for pumping optical fiber. More particularly, the present disclosure describes the use of a gradient refractive index (GRIN) structure on the side surface of an optical fiber to couple optical pump energy into the fiber for use in fiber lasers and amplifiers.

2. Description of Related Art

Numerous applications require the generation or amplification of optical signals. Optical systems using optical fiber are often preferred due to the cost, size, weight and other aspects of the optical fiber. Fiber optic systems are used in a large variety of commercial and military applications, such as in telecommunication systems, satellite communication systems, and radar systems. However, such applications and other applications known in the art may require the generation and/or amplification of optical signals with significant optical power in optical fiber.

To achieve high power levels, fiber amplifiers and fiber lasers require optical energy at high levels to be injected within the region of an optical fiber that includes an active gain medium that provides the optical gain. The active gain medium typically comprises the core of the optical fiber doped with rare earth elements such as erbium (Er), ytterbium (Yb), erbium-ytterbium (ErYb), neodymium (Nd), thulium (Tm), etc. When subjected to optical pump energy (typically having a wavelength from 800 nm to 1400 nm depending on the gain medium), the ions within the gain medium are excited to their upper lasing level, which provides that the optical fiber may then be used to generate or amplify optical signals.

One approach known in the art for pumping an optical fiber is by end-pumping. In end-pumping, the output from single-mode laser diodes may be directly coupled into the core of the fiber at the end of the fiber. A wavelength division multiplexer may be used to direct the pumping radiation from the laser diodes into the portion of the fiber containing the active gain medium. See, for example, "Optical fiber amplifiers: materials, devices, and applications," S. Sudo, ed. Artech House Inc., 1999, pp. 406-407 and p. 432. However, this method of pumping provides relatively low power levels, since only a relatively low power level can be applied to the very small end surface of the fiber. Attempts to provide higher levels of power will generally result in laser-induced damage to the fiber. Typically, the maximum power output seen with end-pumping is about 100 mW, since 100-200 mW is typically the maximum power level that can be coupled into the fiber core at the lowest transverse mode from laser diodes.

Higher output powers may be obtained by side-pumping optical fibers that are dual clad fibers. A dual clad fiber typically comprises a doped single-mode core surrounded by a multi-mode inner cladding that guides pump radiation along and around the doped core. Optical pump energy may then be coupled into the inner cladding from the side of the optical fiber using various techniques known in the art. Dual clad optical fibers provide the ability to couple more power into the cladding, thus resulting in a much higher output power than that typically obtained from a single mode fiber. The dual clad optical fiber also has a cross-section that is much larger than the cross-section of single-mode fiber, which also provides for an increased pump power and, therefore an increased power output. However, the power output of side-pumped optical fibers using techniques known in the art may still be rather small when compared to the power output provided by other laser technologies.

One technique for side-pumping an optical fiber is described in U.S. Pat. No. 5,854,865, by Goldberg and issued Dec. 29, 1998. Goldberg describes fabricating a groove or micro-prism into at least a portion of the inner cladding of an optical fiber. Pump energy is then applied to the optical fiber from a direction opposite the groove or micro-prism such that the pump light travels through the fiber in a direction generally perpendicular to the core. The pump light then reflects from the facets of the groove or micro-prism and is directed along the core of the fiber. However, cutting a groove or micro-prism in the inner cladding may impair the mechanical property of the fiber resulting in decreased reliability for the fiber. In addition, the groove or micro-prism provides only a relatively small surface for reflection of the pump light, thus restricting the total energy of the pump light to avoid optical damage to the surface of the groove or micro-prism.

Another approach for side-pumping is disclosed in Heflinger, et al., "Apparatus for Optically Pumping an Optical Fiber from the Side," EP 1 065 764 A2, published Jan. 3, 2001. Heflinger, et al. describe an optical fiber using a diffraction grating to receive and reflect pump light into the inner cladding of a dual clad active optical fiber. According to Heflinger, et al., the diffraction grating may be imprinted on the surface and into the inner cladding, may be separately disposed subjacent or adjacent the surface of the inner cladding, or may be provided by recording a diffraction grating within the inner cladding. However, imprinting a grating on and/or within the inner cladding may weaken the fiber mechanically. Providing a diffraction grating subjacent or adjacent the inner cladding may complicate the fabrication of the pumped optical fiber. Recording a diffraction grating in the inner cladding may comprise forming an inclined Bragg grating in the inner cladding. However, because the refractive index variation $\Delta n$ typically available in active optical fibers is low (usually, $\Delta n < 10^{-3}$), the grating must be rather thick (>100 µm) for high diffraction efficiency. In turn, the pump beam should have very low divergence ($<3 \times 10^{-4}$ rad) to satisfy the Bragg conditions, something that may be complicated to realize in practice.

Still another approach for side-pumping an optical fiber is presented in Th. Weber, E. Luthy, H. P. Weber, "Side-pumped Fiber Laser," Apply. Phys. B., v. 63, pp. 131-134, 1996. Weber, et al. propose the use of a prism connected to the optical fiber through immersion oil. Both the prism and the immersion oil have the same refractive index as the fiber cladding. The pump energy is directed into the cladding at a large angle of incidence through the refracting side of the prism. The coupling efficiency for such a system was reported as 45.3%. However, to increase the interaction area and, therefore, to increase the total power coupled into the fiber without laser-induced damage of the fiber surface, Weber et al. disclose that the pump energy is applied at an angle of incidence close to 90°. This angle of incidence results in having a small surface area available on the refracting side surface of the prism. Hence, the refracting surface may be damaged with elevated levels of pump energy.

Still another approach for side-pumping is disclosed in Manzur, "Side-pumped Fiber Laser," WO 00/54377, published Sep. 14, 2000. Manzur discloses creating a coupling window integrally formed within a channel formed in an upper side of the fiber cladding of a single clad optical fiber. This structure then provides for direct pumping of the core of the single clad fiber. Manzur discloses that different shapes for the windows may be used as well as different materials for the windows to improve the coupling efficiency. Manzur discloses that the window may comprise a graded index material or step index material to improve the design of the side-pumping device and to increase the coupling area. However, the small diameter of the core of the optical fiber serves to limit the size of the laser beam applied to the coupling area. This then limits the optical power that may be used in pumping the optical fiber.

Still another approach for side-pumping is disclosed in Hollister et al., "Fiber amplifier having a prism for efficient coupling of pump energy," U.S. Pat. No. 6,625,354, Holister teaches an optical fiber amplifier employing a prism to couple pump energy into the pump core of a dual clad fiber. Holister shows embodiments using traditional optical lens in the optical path between the pump source and the fiber being pumped, but also shows an embodiment wherein a traditional optical lens is replaced with graded index lens which has a varying index of refraction across its optical axis.

As noted above, prior art approaches may limit the amount of pumping energy that may be applied to an active optical fiber, thus limiting the magnitude of the optical output from the active optical fiber. High-power laser diodes are available for use in applying pump energy to optical fibers, but the prior art approaches may limit the amount of power that can be applied from these laser diodes and other pump energy sources because of concerns about laser-induced damage to the pumped fiber. Therefore, there is a need in the art for an apparatus and method that provides for increased pumping energy to be applied to an active optical fiber without resulting in damage to the pumped fiber.

SUMMARY

Embodiments of the present invention provide a method and apparatus for pumping fiber oscillators and amplifiers. Pump energy is directed through a gradient refractive index (GRIN) structure disposed on the side surface of an optical fiber. The pump energy is preferably applied under a large angle of incidence. The use of a GRIN structure allows for the exclusion of strong beam reflection at the boundary of the side surface of the optical fiber, while the large angle of incidence allows for an increase in the area to which pump energy is applied, which allows for an increase in the total pumping power without damage to the fiber surface.

One embodiment of the present invention comprises a pumped optical fiber having: a core; an inner cladding; an optical element adapted to direct pump energy into the inner cladding; and a gradient refractive index structure disposed between the inner cladding and the optical element, the gradient refractive index structure having a refractive index changing from a first refractive index at a boundary with the optical element to a second refractive index at a boundary with the inner cladding. The optical fiber preferably comprises a dual clad optical fiber. The optical element may comprise a prism.

Another embodiment of the present invention comprises a method for pumping an optical fiber having the steps of: providing an optical fiber having a core and an inner cladding, wherein the inner cladding comprises material having a first refractive index; directing pump energy into an optical element, wherein the optical element comprises material having a second refractive index, the second refractive index having a value larger than the first refractive index; and directing pump energy through a structure disposed between the optical element and the inner cladding, the structure having a changing refractive index, the changing refractive index having a value at or less than the value of the second refractive index at a boundary of the structure nearest the optical element and having a value at or greater than the value of the first refractive index at a boundary nearest the inner cladding.

BRIEF DESCRIPTION OF THE DRAWINGS

The features and advantages of the present invention will become better understood with regard to the following description, appended claims, and accompanying drawings.

FIG. 1A shows a lengthwise view of a side-pumped optical fiber in which a lens and prism are used to direct pump energy into the fiber.

FIG. 1B shows a cross-sectional view of the apparatus depicted in FIG. 1A.

FIG. 2A shows a lengthwise view of a side-pumped optical fiber in which a lens and prism are used to direct pump energy into the fiber and a GRIN structure is disposed between the prism and the fiber.

FIG. 2B shows a cross-sectional view of the apparatus depicted in FIG. 2A.

DETAILED DESCRIPTION

Figure 3:
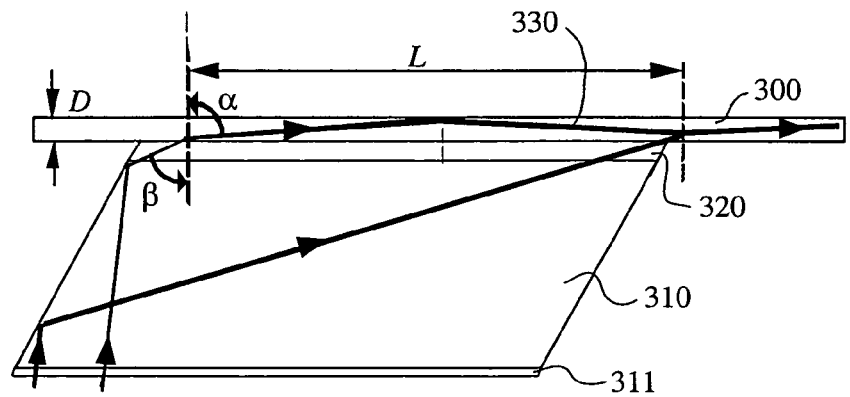
FIG. 3 shows a side-pumped optical fiber in which a rhombic prism is used to direct pump energy into the fiber.

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of certain elements shown in the accompanying drawings may be exaggerated to more clearly show details. The present invention should not be construed as being limited to the dimensional relations shown in the drawings, nor should the individual elements shown in the drawings be construed to be limited to the dimensions shown.

Embodiments of the present invention make use of Snell's law of refraction. Under Snell's law, if a beam propagates from a medium with a larger refractive index to a medium with a lower refractive index, it can be directed in the second medium under a very large angle of refraction close to 90°, while the angle of incidence in the first medium maintains a value that is clearly less than 90°. Embodiments of the present invention, therefore, make use of an apparatus that provides for the transition from a larger refractive index to a smaller refractive index.

One possible design of a side pumped fiber amplifier is depicted in FIGS. 1A and 1B. FIGS. 1A and 1B show a dual clad fiber 100 with a core 110, an inner cladding 120 and an outer cladding 130. FIG. 1A shows a lengthwise view of the fiber 100 and FIG. 1B shows a cross-section view of the fiber 100. In dual clad fibers, the inner cladding 120 typically has a rectangular or hexahedral shape for coupling/carrying pump light. FIGS. 1A and 1B show the inner cladding as having a width d and a height D. Typically, the dimensions of d×D are approximately 100 µm by 200–300 µm. If this fiber 100 were conventionally end-pumped, the area of the fiber end surface (Se) available for coupling pump light from a laser diode or other pump source would be d×D, or up to approximately 30000 µm².

A prism or another optical element made from optical material with a refractive index $n_m$, which is larger than the refractive index $n_f$ of the fiber, and a focusing system to concentrate a pump energy beam onto a side surface of an optical fiber are preferably provided. FIGS. 1A and 1B show a prism 140 disposed against a portion of the inner cladding 120 of the optical fiber 100. A lens 160 is used to direct and focus a pump energy beam 150 into the prism 140.

Preferably an optical element, which couples pump energy into the optical fiber, and a focusing system, which directs pump energy into the optical element and then into the optical fiber, are disposed to maximize the energy applied to the optical fiber and to minimize optical losses. For example, the lens 160 preferably shapes the pump energy beam 150 to provide a size less than d (the width of the inner cladding) in one direction, and a larger size L in a direction along the optical fiber 100. Hence, the lens 160 may be a cylindrical lens. The size less than d allows the pump energy beam to be coupled into the inner cladding 120 without losses. The large size L allows for an increase in the coupling area for pump energy, which allows a proportional increase in the total optical power applied to the optical fiber without fiber damage.

From FIG. 1A, it can be seen that L should be less than or equal to 2D×tan α, where α is the angle of refraction of the pump beam 150 in the fiber 100 such that the pump beam 150 does not return into the prism 140. With the fiber 100 side-pumped in this fashion, it can be seen that the area of the fiber side surface ($S_s$) available for coupling the pump energy into the fiber is equal to d×L. Hence, the total increase k in the area for side-pumping the optical fiber when compared to end-pumping is shown by the following equations:

$$k = \frac{S_s}{S_e} = \frac{d \cdot L}{d \cdot D} \quad \text{Eq. 1}$$

$$k = \frac{L}{D} = 2\tan\alpha$$

Thus, the ratio L/D is a measure of the increase in the area used for coupling a beam from the side in comparison with the area used for coupling through the end face of the fiber. As an example, the value of this ratio was calculated at 980 nm wavelength for various angles of refraction in the fiber for a prism made from glass BK7 with refractive index $n_m$=1.508. The inner cladding of the fiber was made from a fused silica with a refractive index $n_f$=0.458 at the same (980 mn) wavelength. The resultant data is collected in Table 1 as presented below. Table 1 also shows the twin dependencies of light incidence angle β and reflectance R for non-polarized light, on the angle of refraction calculated from the well-known formulas for Snell's law and Fresnel's reflection:

$$\beta = \arcsin\left(\frac{n_f}{n_m}\sin\alpha\right) \quad \text{Eq. 2}$$

$$R = 0.5\left[\frac{\tan^2(\alpha-\beta)}{\tan^2(\alpha+\beta)} + \frac{\sin^2(\alpha-\beta)}{\sin^2(\alpha+\beta)}\right] \quad \text{Eq. 3}$$

TABLE 1

| α, deg. | k | β, deg. | R, % |
| --- | --- | --- | --- |
| 84 | 19 | 72.04 | 23 |
| 85 | 23 | 72.33 | 29 |
| 86 | 29 | 72.58 | 37 |
| 87 | 38 | 72.77 | 47 |
| 88 | 57 | 72.92 | 61 |
| 89 | 115 | 73.01 | 78 |
| 89.5 | 229 | 73.03 | 88 |

As the angle of refraction α approaches 90°, the area used for pumping can be increased from tens to hundreds of times the area that may be used for end-pumping. This increase in pumping area makes it possible to use a more powerful laser for pumping. Also note that the angle of beam incidence β is clearly less than 90°. Since the angle of beam incidence β may be less than 90°, the rather large size of the beam can be conserved on the surfaces of the optical elements connected to the fiber. This also allows the design according to embodiments of the present invention to be simplified compared to others known in the art.

However, a key concern of the design depicted in FIGS. 1A and 1B is the high reflectance R on the boundary between the inner cladding 120 and prism 140 because of the very large angle of refraction (See also Table 1). This high reflectance could lead to high losses and decrease the amount of optical power to be obtained from the pumped optical fiber.

In a preferred embodiment of the present invention, a gradient refractive index (GRIN) layer is used to provide a smoothly changing refractive index on the boundary between the prism and the inner cladding, instead of the stepwise change in the refractive index of the optical fiber shown in FIGS. 1A and 1B. FIGS. 2A and 2B illustrate a pumped optical fiber 200 in which a GRIN layer 210 is used.

As shown in FIGS. 2A and 2B, the pumped optical fiber 200 comprises a core 110, an inner cladding 120 and an outer cladding 130. FIG. 2A shows a length wise view of the fiber 200 and FIG. 2B shows a cross-sectional view of the fiber 200. A prism 140 and a lens 160 are used to direct pump energy 150 into the inner cladding 120. A GRIN layer 210 is disposed between the prism 140 and the inner cladding 120 to provide a smoothly changing transition from the refractive index of the prism 140 to that of the inner cladding 120. If the prism 140 and the inner cladding 120 are fabricated from the same materials as discussed above (glass BK7 with refractive index $n_m$=1.508 and fused silica with refractive index $n_f$=1.458, respectively) and pump energy is applied at the wavelength discussed above (980 nm), the same parameters shown in Table 1 will be obtained, but the reflectance losses will be close to zero.

FIG. 3 illustrates an embodiment of the present invention in which an optical fiber 300 is side-pumped with a rhombic prism 310 and a GRIN layer 320. As discussed above, the maximum power that can be applied to the optical fiber 300 depends upon the side surface available for coupling the light and, as discussed above, this maximum power depends upon the angle of incidence. If the optical fiber 300 comprises standard fused silica with a refractive index of 1.458 at an optical wavelength of 980 nm and a inner cladding cross-section of d×D=150 µm×300 µm, the proper angle of incidence for a laser diode beam supplying pump power can be calculated as discussed below. As described in additional detail below, performance may be improved by disposing an antireflection layer 311 on the surface of the prism 310 receiving pump energy.

Surface damage of the optical fiber occurs if the area of interaction S between the optical fiber and the pump beam is less than W/P, where W is the total power from the pump laser diode and P is the power density which is the laser-induced damage threshold of the fiber surface. For a suitable design margin, an area of an order of magnitude more is chosen to help ensure that no laser-induced damage occurs. Therefore, since the area of interaction is given by S=L×d, L is chosen as L=10S/d. To prevent the beam decoupling through the same boundary of contact, the angle of refraction inside the fiber should provide a beam crossing through the fiber after only one reflection over the length L. See also line 330 in FIG. 3. Therefore, the length L and the angle of refraction are represented by:

$$L = \frac{10S}{d} = \frac{10W}{dP} \qquad \text{Eq. 4}$$

$$\alpha = \tan^{-1}\left(\frac{L}{2D}\right) = \tan^{-1}\left(\frac{10W}{2dDP}\right) \qquad \text{Eq. 5}$$

The power of the laser diode used for pumping can reach 100 W. The laser-induced damage threshold of fused silica is greater than $10^5$ W/cm$^2$, so, from equations 4 and 5, the length L is about 0.7 cm and α is <85°. However, an angle of refraction of 85° is still too big for the practical design of a coupling device; therefore, a material with a refractive index higher than the refractive index of fused silica would be a preferred material for the coupling device. If the coupling device has just a 0.1 higher value for the refractive index increment in this material, the angle of incidence β on the fiber surface, as calculated by equation 2, will be <70°. This is a reasonable angle for the design of coupling devices with optical elements like triangle prisms, rhombic prisms, etc. as input devices.

As was mentioned above, to exclude the high reflective losses on the fiber boundary, which could be ~40% in the example discussed immediately above, the use of a GRIN layer 320 with a smooth variation of the refractive index from the index of the prism 310 to the index of the fiber 300 is proposed. The present technologies of GRIN structure formation allow reaching a refractive index increment of up to 0.05-0.1. This value is big enough to create the desired transition with no reflection on the boundary. It is noted that the biggest contribution to the reflective losses arises from the large angles of incidence. Therefore, a GRIN structure with a refractive index increment of even a few hundredths should reduce these losses significantly. Following that, the total losses may be further minimized up to a few percents using an antireflection coating at the entrance surface of a coupling device and an additional layer with a step refractive index change.

Figure 4:
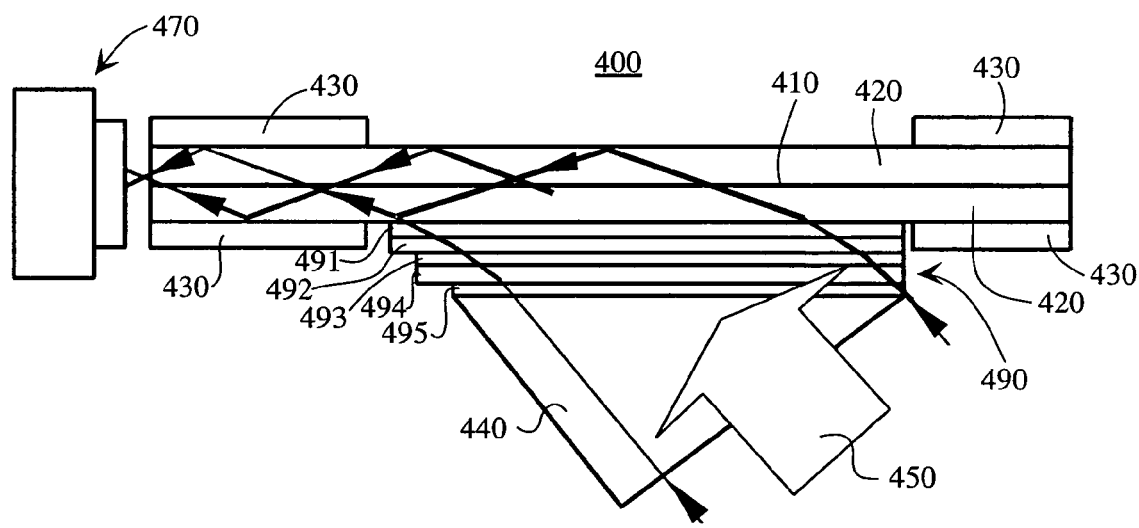
FIG. 4 shows an experimental configuration of an optical fiber in which a simulated GRIN structure is used to direct light into the optical fiber.

To show that a GRIN layer may be used to provide the appropriate transition in refractive indices between an optical fiber and a prism, a GRIN layer was simulated by using a few kinds of fused silica plates doped with different concentrations of germanium, i.e., plates having close refractive indices. Proper matching liquids were used to connect them to each other and to the prism. An optical fiber 400 used in the experimental apparatus and using the simulated GRIN layer 490 is shown in FIG. 4. Table 2 presents the refractive indices of each of the materials used in the layers 491-495 of the simulated GRIN layer 490.

TABLE 2

| # | Material | Refractive index |
|---|----------|------------------|
| 420 | SiO$_2$ (fiber) | 1.4571 |
| 491 | Matching liquid | 1.4579 |
| 492 | SiO$_2$: Ge | 1.4610 |
| 493 | Matching liquid | 1.4629 |
| 494 | SiO$_2$: Ge | 1.4666 |
| 495 | Matching liquid | 1.4756 |
| 440 | BK7 (prism) | 1.5152 |

FIG. 4 shows an optical fiber 400 comprising a core 410, an inner cladding 420, and an outer cladding 430. The simulated GRIN layer 490 was disposed between a prism 440 and the inner cladding 420. A beam 450 of visible radiation from a He—Ne laser was directed into the prism 400 so as to provide an angle of refraction within the optical fiber 400 between 87° and 88°. A photodetector 470 was used to detect the optical beam energy coupled into the optical fiber 400.

As shown in FIG. 4, the simulated GRIN layer 490 comprised multiple layers of fused silica plates and matching liquids. As noted above, Table 2 shows the refractive indices of each of the layers 491-495 of the GRIN layer 490. The glasses and liquids used in the GRIN layer 490 were transparent at the wavelength of the He—Ne laser; therefore, any losses were due to the reflections from the surfaces.

Calculations were then performed for the losses due to reflections from each of the surfaces, including the reflections on the front surface of the prism 440 and the output surface of the fiber 400. The calculated transmissions through all the different boundaries are shown in Table 3. The calculations were performed for an angle of refraction a of 87° and 88°.

TABLE 3

| Refractive index | Transmission of boundaries for α = 87°, % | Transmission of boundaries for α = 88°, % |
|---|---|---|
| 1.4571 | | |
| 1.4579 | 99.3 | 97.5 |
| 1.461 | 96.7 | 93.6 |
| 1.4629 | 99.5 | 99.3 |
| 1.4666 | 99.1 | 98.8 |
| 1.4756 | 98.1 | 97.8 |
| 1.5152 | 94.2 | 93.8 |
| The front surface of the prism | 95.8 | 95.8 |
| The output surface of the fiber | 96.5 | 96.5 |
| The total transmission | 80.9 | 75.9 |

As can be seen from Table 3, the expected maximum transmission of the prism 440 and GRIN layer 490 shown in FIG. 4 is between 76% and 81%. In the experiments performed with the apparatus depicted in FIG. 4, the transmission was found to be 67%, about 83% to 88% of the expected maximum value.

The experiments performed with the apparatus shown in FIG. 4 and the He—Ne laser show the high efficiency of the prism and the simulated GRIN layer combination. The use of a real GRIN layer and a proper immersion substance between the GRIN layer and the fiber should allow the exclusion of losses connected with reflection and achieve even more efficient coupling of the pump beam into the fiber. Note that the proper immersion substance should exclude any air between the GRIN layer and the fiber so as to exclude any additional reflections between the two. Calculations have shown that optimization of the conditions for focusing a laser beam in the fiber and the application of antireflection optics should allow the achievement of a coupling efficiency close to 100%.

After demonstrating a high coupling efficiency with a high quality He—Ne laser beam, a second set of experiments with a real diode laser at a wavelength of 980 nm were carried out. These experiments were conducted to measure the coupling efficiency of the IR laser beam from the diode laser and, therefore, to measure the total losses on the boundary between the prism and the fiber in order to compare the measured losses with the calculated data. The experimental set-up using a diode laser is shown in FIG. 5.

Figure 5:
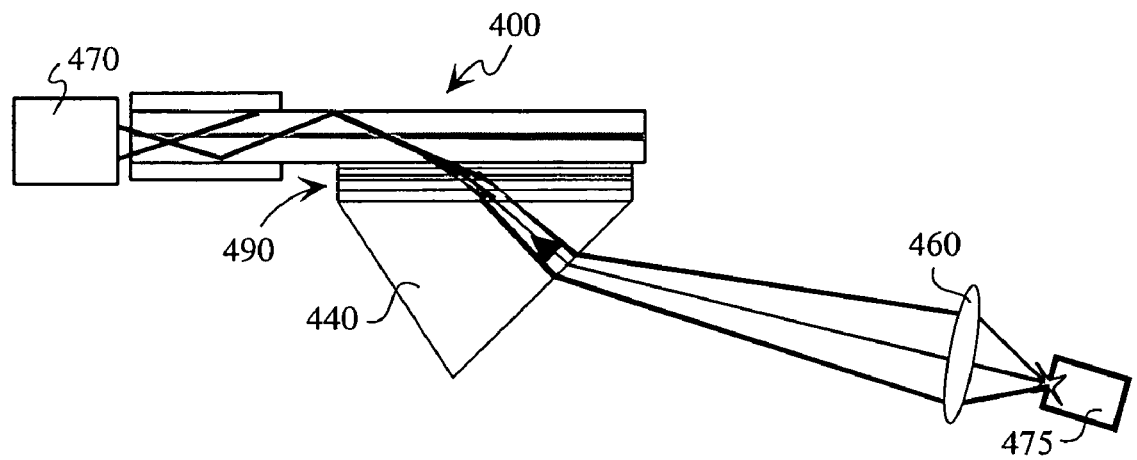
FIG. 5 depicts the experimental set-up used to measure the optical losses of the optical fiber shown in FIG. 4 when pumped with a diode laser.

As shown in FIG. 5, a laser diode 475 (SLD 6370-A from JDS Uniphase Corporation, San Jose, Calif. 95134) with an emitting area size of 1 μm×100 μm and a beam divergence of 14°×35° was used in the experiments. The diode 475 was disposed to allow accurate adjustment to direct the focusing beam through the prism 440 and GRIN layer 490 onto the side surface of the optical fiber 400. Because of its high beam divergence, the laser beam from the laser diode 475 was focused by a single spherical lens 460 with a large numerical aperture. The spherical lens 460 was chosen because the original beam had a very strong asymmetry in two directions. The spherical lens 460 had strong aberrations which prevented a good focusing of the total power of the beam onto the side surface of the fiber 400. Nevertheless, the experimental set-up allowed for effective measurements of the coupling efficiency to be made.

Figure 6:
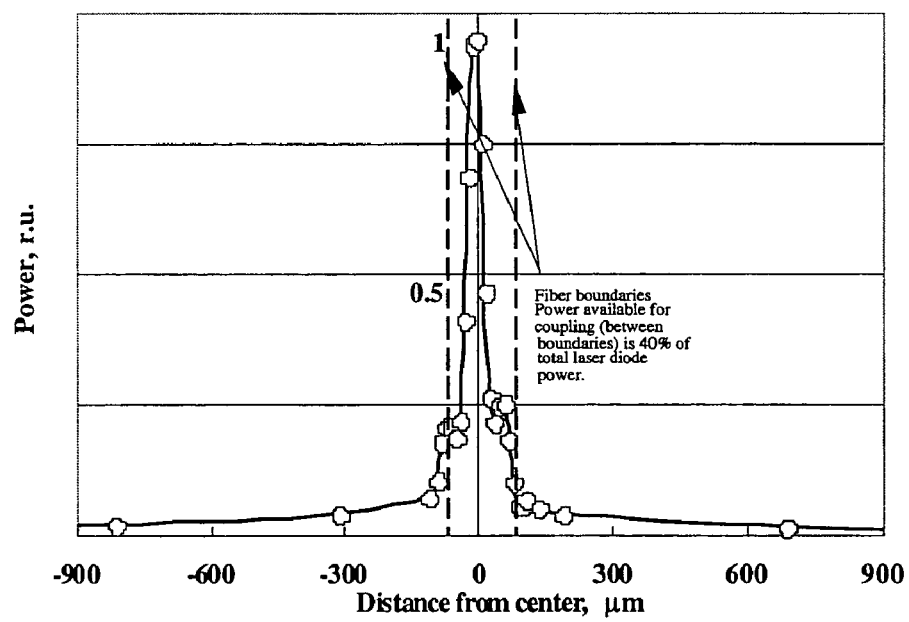
FIG. 6 shows the distribution of the laser diode intensity used in the experimental set-up shown in FIG. 5.

To estimate the power available for coupling (i.e., the portion of the power which was concentrated on the side surface of the fiber and could be coupled in principle), the distribution of the laser diode intensity in the focal plane of the lens was measured. This distribution is shown in FIG. 6. One can see that only an estimated 40% of the total laser diode power can be sent into the fiber. The actual measurements showed that the beam power coupled into the fiber was 35% of the beam power in the prism. This means that the coupling efficiency reached 87.5%. This value is rather close to the theoretical value calculated from the reflections on the multiple boundaries of a step GRIN layer simulated to correspond to the real one and indicates that a coupling efficiency of close to 100% can be reached in the case of a real GRIN layer used without any stepwise change in the refractive index.

Figure 7:
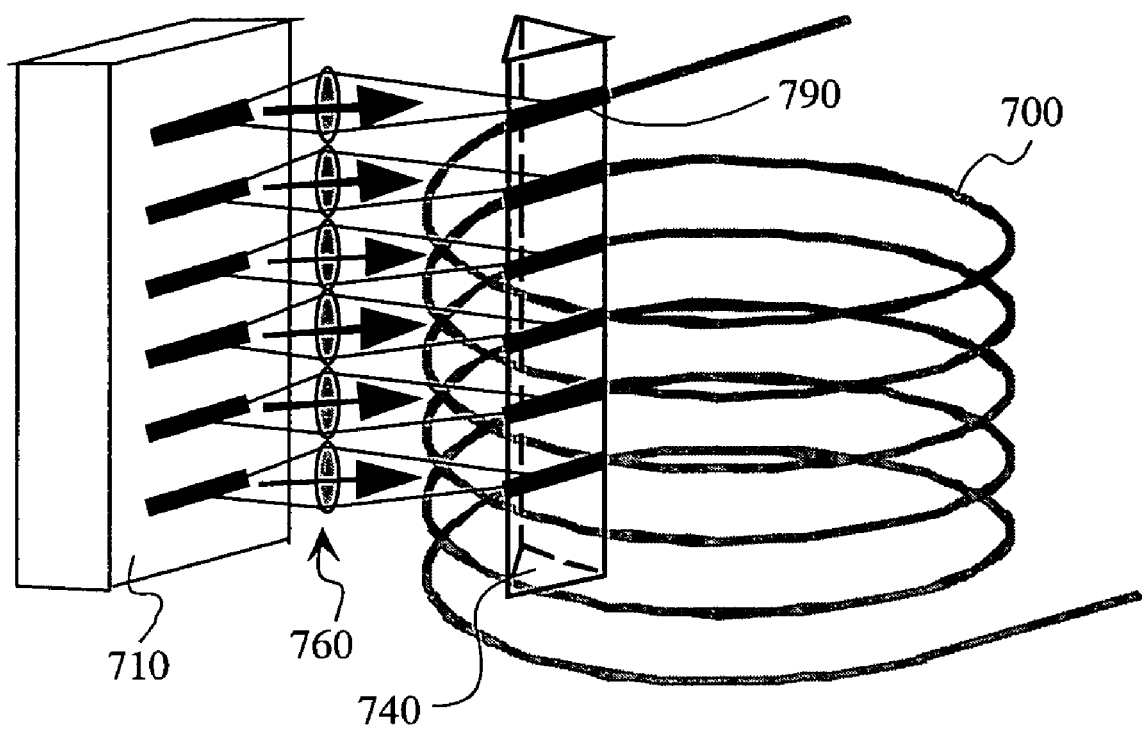
FIG. 7 shows a laser diode being used to pump multiple segments of an optical fiber where the pump energy is directed into the fiber through GRIN structures.

Embodiments of the present invention allow for a rather convenient and efficient usage of the modern powerful laser diode bar for fiber amplifier pumping. A laser diode bar generally comprises an array of strip laser diodes. FIG. 7 shows an embodiment of the present invention in which a laser diode bar is used to pump multiple segments of an optical fiber.

In FIG. 7, the beams from a laser diode bar 710 are focused by a lens array 760 onto the side surface of a fiber 700 through a prism 740 or another appropriate optical element used as an input device. A GRIN layer 790 between the prism 740 and the fiber 700 is employed to exclude coupling losses. The fiber 700 is twisted into a spool where the length of each coil is preferably chosen on the basis of the total absorption into the fiber 700 of the pumping power coupling from a corresponding laser diode. As can be seen from FIG. 7, the use of multiple pumped segments allows for an increase in the pump power that can be applied to the optical fiber 700 without resulting in optical damage, thus providing for an overall increase in the power output by the optical fiber 700. Those skilled in the art will understand that other configurations of laser diode bars or other pump energy sources may also be used to pump multiple segments of optical fiber that may be in configurations other than coils.

Having described the invention in connection with the embodiments presented above, modification will now certainly suggest itself to those skilled in the art. As such, the invention is not to be limited to the disclosed embodiments except as required by the appended claims.

What is claimed is:

1. A pumped optical fiber comprising:
a core;
an inner cladding;
an optical element adapted to direct pump energy into the inner cladding; and
a gradient refractive index structure disposed between the inner cladding and the optical element, the gradient refractive index structure having a varying refractive index changing from a first refractive index at a boundary with the optical element to a second refractive index at a boundary with the inner cladding,
wherein the optical element has an index of refraction that is greater than the index of refraction of the inner cladding and the first refractive index is greater than the second refractive index.

2. The pumped optical fiber according to claim 1, wherein the pumped optical fiber further comprises a plurality of gradient index structures disposed at different segments of the optical fiber between the inner cladding and the optical element, each gradient index structure of the plurality of gradient index structures having a varying refractive index changing from a first refractive index at a boundary with the optical element to a second refractive index at a boundary with the inner cladding.

3. The pumped optical fiber according to claim 2, wherein the optical fiber is disposed as multiple coils.

4. The pumped optical fiber according to claim 2, wherein the optical element comprises a plurality of optical subelements, each optical subelement receiving pump energy and directing the pump energy to one gradient index structure of the plurality of gradient index structures.

5. A pumped optical fiber comprising:
a core;
an inner cladding;
an optical element adapted to direct pump energy into the inner cladding; and
a gradient refractive index structure disposed between the inner cladding and the optical element the gradient refractive index structure having a Varying refractive index changing from a first refractive index at a boundary with the optical element to a second refractive index at a boundary with the inner cladding,
wherein the optical element has an index of refraction that is greater than the index of refraction of the inner cladding and the first refractive index is greater than the second refractive index,
wherein the gradient refractive index structure comprises a beginning layer, an ending layer, and a plurality of intermediate layers, the beginning layer having a refractive index equal to the first refractive index, the ending layer having a refractive index equal to the second refractive index, and each intermediate layer of the plurality of intermediate layers having a different refractive index to provide an incremental change in the varying refractive index from the first refractive index to the second refractive index.

6. The pumped optical fiber according to claim 5, wherein the gradient refractive index structure provides a smooth variation of the varying refractive index from the first refractive index to the second refractive index.

7. The pumped optical fiber according to claim 5, wherein pump energy is directed into the optical element at an angle of incidence that results in the pump energy having an angle of refraction within the optical fiber of between 80° and 90°.

8. The pumped optical fiber according to claim 5, wherein the optical element comprises an optical prism.

9. The pumped optical fiber according to claim 5, wherein the pumped optical fiber further comprises an anti-reflection layer disposed at a surface of the optical element adapted to receive the pump energy.

10. A pumped optical fiber comprising:
a core;
an inner cladding;
an optical element adapted to direct pump energy into the inner cladding; and
a gradient refractive index structure disposed between the inner cladding and the optical element, the gradient refractive index structure having a varying refractive index changing from a first refractive index at a boundary with the optical element to a second refractive index at a boundary with the inner cladding
wherein the optical element has an index of refraction that is greater than the index of refraction of the inner cladding and the first refractive index is greater than the second refractive index,
wherein the inner cladding has a width dimension represented by d and a depth dimension represented by D, and the laser-induced power density damage threshold of the inner cladding is represented by P and the pump energy has a power represented by W, and wherein L represents the lateral dimension along the optical fiber to which the pump energy is applied and a represents the angle of refraction within the optical fiber, wherein the values for L and a are selected based on the following equations:

$$L > \frac{W}{dP} \text{ and } \alpha > \tan^{-1}\left(\frac{W}{2dDP}\right).$$

11. A method for pumping an optical fiber comprising:
providing an optical fiber having a core and an inner cladding, wherein the inner cladding comprises material having a first refractive index;
directing pump energy into an optical element, wherein the optical element comprises material having a second refractive index, the second refractive index having a value larger than the first refractive index; and
directing the pump energy through a structure disposed between the optical element and the inner cladding, the structure having a changing refractive index, the changing refractive index having a value at or less than the value of the second refractive index at a boundary of the structure nearest the optical element and having a value at or greater than the value of the first refractive index at a boundary nearest the inner cladding.

12. The method according to claim 11, wherein the optical element comprises one or more optical subelements and directing pump energy through a structure comprises directing pump energy through a plurality of structures, each disposed between the one or more optical subelements and the inner cladding, each structure of the plurality of structures having a changing refractive index, the changing refractive index having a value at or less than the value of the second refractive index at a boundary of the structure nearest the one or more optical subelements and having a value at or greater than the value of the first refractive index at a boundary nearest the inner cladding.

13. A method for pumping an optical fiber comprising:
providing an optical fiber having a core and an inner cladding, wherein the inner cladding comprises material having a first refractive index;
directing pump energy into an optical element, wherein the optical element comprises material having a second refractive index, the second refractive index having a value larger than the first refractive index; and
directing the pump energy through a structure disposed between the optical element and the inner cladding the structure having a changing refractive index, the changing refractive index having a value at or less than the value of the second refractive index at a boundary of the structure nearest the optical element and having a value at or greater than the value of the first refractive index at a boundary nearest the inner cladding,
wherein the structure comprises two or more layers, the two or more layers having refractive indices increasing in value from a refractive index value at or greater than the value of the first refractive index for the layer of the two or more layers disposed at the boundary nearest the inner cladding to a refractive index value at or less than the value of the second refractive index at the boundary nearest the optical element.

14. The method according to claim 13, wherein the structure comprises a gradient refractive index structure and the changing refractive index
smoothly decreases from a value at or less than the value of the second refractive index to a value at or greater than the value of the first refractive index.

15. The method according to claim 13, wherein directing pump energy into an optical element comprises directing the pump energy into the optical element at an angle of incidence that results in the pump energy having an angle of refraction within the optical fiber of between 80° and 90°.

16. The method according to claim 13, wherein the optical element comprises an optical prism.

17. The method according to claim 13, wherein said method further comprises suppressing transmission of light from the inner cladding to the structure.

18. A method for pumping an optical fiber comprising:
providing an optical fiber having a core and an inner cladding, wherein the inner cladding comprises material having a first refractive index;
directing pump energy into an optical element wherein the optical element comprises material having a second refractive index, the second refractive index having a value larger than the first refractive index; and
directing the pump energy through a structure disposed between the optical element and the inner cladding, the structure having a changing refractive index, the changing refractive index having a value at or less than the value of the second refractive index at a boundary of the structure nearest the optical element and having a value at or greater than the value of the first refractive index at a boundary nearest the inner cladding,
wherein the inner cladding has a width dimension represented by d and a depth dimension represented by D, and the laser-induced power density damage threshold of the inner cladding is represented by P and the pump energy has a power represented by W, and wherein L represents a lateral dimension along the optical fiber to which the pump energy is applied and a represents the angle of refraction within the optical fiber, wherein the method further comprises selecting values for L and a based on the following equations:

$$L > \frac{W}{dP} \text{ and } \alpha > \tan^{-1}\left(\frac{W}{2dDP}\right).$$

19. An optical gain device comprising:
    a core comprising laser active material;
    an inner cladding;
    means for directing pump energy into said inner cladding; and
    means for providing a changing refractive index disposed between said inner cladding and said means for directing pump energy, said means for providing a changing refractive index having a refractive index changing from a first refractive index at a boundary with the means for directing pump energy to a second refractive index at a boundary with the inner cladding,
    wherein the means for directing pump energy has an index of refraction that is greater than the index of refraction of the inner cladding and the first refractive index is greater than the second refractive index.

20. The device according to claim 19, wherein pump energy is directed into the means for directing pump energy at an angle of incidence that results in the pump energy having an angle of refraction within the inner cladding of between 80° and 90°.

21. The device according to claim 19 further comprising means for focusing pump energy onto said means for directing pump energy.

22. An optical gain apparatus comprising:
    an optical fiber having an active core and an inner cladding, wherein the optical fiber has a plurality of pump areas, each pump area defined by a different sectional area of the inner cladding;
    a plurality of gradient refractive index structures, each gradient refractive index structure disposed at a corresponding pump area;
    an optical element directing pump energy to the plurality of gradient refractive index structures, wherein the optical element has a constant refractive index throughout the optical element and wherein said constant refractive index is greater than a refractive index of the inner cladding; and
    a source of pump energy, the source of pump energy transmitting pump energy to the optical element.

23. The apparatus according to claim 22, wherein the source of pump energy comprises a laser diode bar comprising an array of strip laser diodes and the apparatus further comprises a lens array receiving pump energy from each strip laser diode and directing the pump energy to the optical element.

24. The apparatus according to claim 22, wherein the optical element comprises a prism.

25. The apparatus according to claim 22, wherein the optical fiber is disposed as a plurality of coils.

26. A pumped optical fiber comprising:
    a core;
    an inner cladding;
    a prism element adapted to direct pump energy into the inner cladding, the prism element having an index of refraction that is greater than the index of refraction of the inner cladding; and
    a gradient refractive index structure disposed at a face of said prism element between the inner cladding and the prism element, the gradient refractive index structure having a varying refractive index changing from a first refractive index at a boundary with the prism element to a second refractive index at a boundary with the inner cladding.

* * * * *